(12) United States Patent
White et al.

(10) Patent No.: US 6,796,786 B2
(45) Date of Patent: Sep. 28, 2004

(54) RUNNER FOR INJECTION MOLDING

(75) Inventors: John Richard White, Wadsworth, OH (US); Robert Henry Vogliano, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/638,912

(22) Filed: Aug. 11, 2003

(65) Prior Publication Data

US 2004/0047943 A1 Mar. 11, 2004

Related U.S. Application Data

(62) Division of application No. 09/659,012, filed on Sep. 8, 2000, now abandoned.

(51) Int. Cl.[7] .............................................. B29C 45/18
(52) U.S. Cl. ................. 425/543; 264/328.6; 264/328.8; 264/328.18; 425/547; 425/572
(58) Field of Search .......................... 264/328.6, 328.8, 264/328.18; 425/543, 547, 572

(56) References Cited

U.S. PATENT DOCUMENTS

| | | | |
|---|---|---|---|
| 3,924,989 A | 12/1975 | Althausen et al. | .......... 425/130 |
| 3,989,434 A | 11/1976 | Mercer | ........................ 425/207 |
| 3,989,793 A | 11/1976 | Hertel et al. | ............. 264/328.4 |
| 4,027,857 A | 6/1977 | Cunningham | ............ 259/4 AB |
| 4,544,519 A | 10/1985 | Schike | ..................... 264/328.1 |
| 4,732,724 A | 3/1988 | Sterner | ........................ 264/251 |
| 4,790,992 A | 12/1988 | Nishikawa | .................. 425/206 |
| 4,965,028 A | 10/1990 | Maus et al. | .............. 264/297.2 |
| 5,262,119 A | 11/1993 | Smith | ......................... 264/513 |
| 5,688,462 A | 11/1997 | Salamon et al. | ........ 264/328.14 |
| 6,399,170 B1 | 6/2002 | Hock et al. | .................. 215/341 |
| 6,607,688 B1 * | 8/2003 | Vogliano et al. | .......... 264/328.8 |

FOREIGN PATENT DOCUMENTS

| | | | | |
|---|---|---|---|---|
| EP | 1108515 | | 6/2001 | ........... B29C/45/00 |
| WO | 9856559 | | 12/1998 | |

OTHER PUBLICATIONS

V. Hörtel, J. Blanke and K. H. Harre; Title: "Thermal and rheological design of large moulds for injection moulding processes", *International Polymer Science and Technology*, vol. 26, No. 9, 1999.

Grant, Julius, ed. Hackh's Chemical Dictionary (4th ed.) McGraw–Hill Book Company, 1969, p. 527.

* cited by examiner

*Primary Examiner*—Tim Heitbrink
(74) *Attorney, Agent, or Firm*—Nancy T. Krawczyk

(57) ABSTRACT

The present invention is directed to the structure of an inline runner for injection molding which uniformly increases the temperature of the injected compound as the compound flows from the injection port to single or multiple drop gates at the entrance to single or multiple injection mold cavities. The inline runner has two opposing series of parallel channels formed into the runner for the purpose of mixing the compound as it flows through the runner.

8 Claims, 3 Drawing Sheets

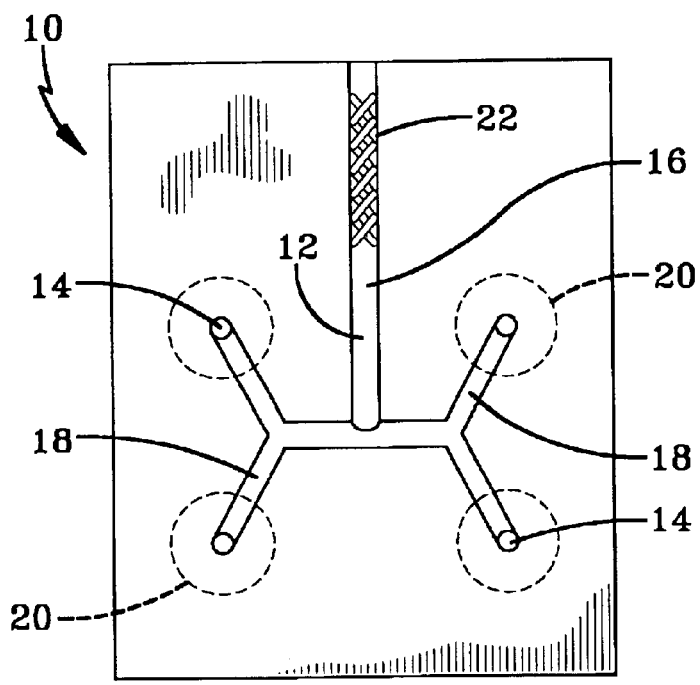
FIG-1
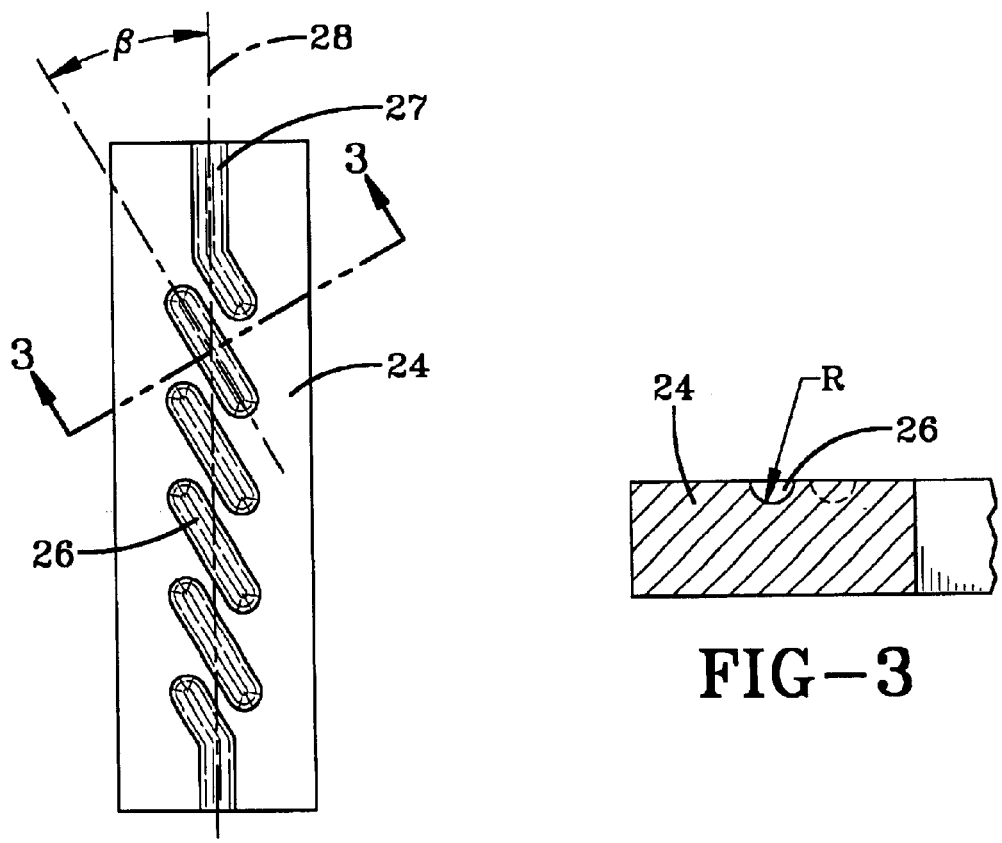
FIG-2
FIG-3

RUNNER FOR INJECTION MOLDING

Related Applications

The present application is a divisional of patent application Ser. No. 09/659,012, filed Sep. 8, 2000, now abandon.

FIELD OF THE INVENTION

The present invention is directed towards the structure of an inline runner of an injection molding machine. The inline runner has opposing series of parallel grooves to provide for mixing of an injected compound as it flows through the runner, uniformly increasing the compound temperature.

BACKGROUND OF THE INVENTION

Traditionally, hot runners have been used in injection molding to distribute rubber from top or side injection ports to small injection gates located at the entrance to single or multiple injection mold cavities. A traditional hot runner is designed to minimize pressure losses through the runner so that the maximum pressure drop and corresponding temperature increase occurs at the drop gate entrances to an injection mold cavity. Rubber flow through a traditional hot runner design is laminar because the high viscosity of the rubber prevents turbulence. Rubber is instead heated as it flows through the runner by conduction and by shear heating at the boundary layer between the rubber flow profile and the surface of the metal mold. Thus the outside layer of rubber in contact with the mold surface is heated, but the rubber flowing through the center of the runner is not heated uniformly by the mold during the short time that a part is being filled.

Attempts have been made to increase the mixing of a fluid material prior to injection into a mold. U.S. Pat. No. 5,262,119 discloses mixing thermoplastic material by placing static mixers in the flow channels leading to a mold. The static mixers act to disperse degraded material or the wrong color material back into the stream for purposes of uniformity. The static mixer is comprised of a fixed twisted metal blade. U.S. Pat. No. 5,688,462 discloses static mixers as part of the cold runners leading into a mold block. The static mixers are a series of baffles, resembling bent fingers, in the runner about which the thermoplastic must flow.

U.S. Pat. No. 3,924,989 discloses an after-mixer in an apparatus for molding thermoset urethane materials. After the components of the material are combined in a mixing chamber, the material is sent into an after-mixer to ensure complete mixing of the components. One disclosed after-mixer is defined by a series of cross channels, the cross-sectional width of the channels increasing and decreasing.

U.S. Pat. No. 4,027,857 discloses a static mixing nozzle for injection molding thermoplastic. The disclosed four way branch static mixer is employed for improved blending of materials.

None of the disclosed after mixers are suitable for rubber molding, nor do any of the teachings appreciate the use of such mixers in thermoelastic or thermoset rubber molding. In the thermoplastic injection molding methods and apparatus disclosed in the prior art, it is a goal to achieve greater color and compound uniformity in the mixing of the thermoplastic or thermoset urethane flow. Heating of the flow stream to its highest optimum temperature is achieved prior to the introduction of the flow stream into the mixer or after-mixer, and to achieve a molded product, the flow stream is cooled after it is injected into the mold to form a solid article. Thus, while it is desired to maintain the flow stream at a defined temperature, it is not a desire of the prior art to increase the temperature of the flow stream as the flow stream travels toward the mold as greater cooling in the mold would be then required if the flow stream entered the mold at a higher temperature.

SUMMARY OF THE INVENTION

The present invention is directed to a method and an assembly for injection molding thermoelastic and thermoset rubbers. The disclosed invention provides for quicker, more efficient, and more uniform heating of the elastomer prior to entering the mold cavity.

The disclosed assembly for injection molding rubber is comprised of a mold cavity, a gate located immediately adjacent to the mold cavity, and a hot runner in communication with the gate. A portion of the hot runner has a first and a second plurality of spaced flow channels disposed at intersecting angles to each other to create cross directional flow of the rubber. The cross directional flow of the rubber provides for heating of the rubber as it flows through the non-linear, non-planar path created for mixing of the rubber along the channels and at the junctions of the cross directional flows; the rubber streams thermally mixing and uniformly increasing the temperature of the rubber.

In one aspect of the invention, the first and second plurality of spaced flow channels are located in a distribution runner adjacent to the gate.

In another aspect of the invention, the first and second plurality of flow channels are inclined at angles of 15° to 70° relative to the centerline of the runner, preferably 30° to 60° relative to the centerline of the runner.

In another aspect of the invention, the first and second plurality of flow channels have a cross-sectional configuration selection from among the following shapes of semicircular, elliptical, triangular, trapezoidal, square, polygonal, and curvilinear.

The disclosed method of producing a molded rubber article comprises injecting a rubber into a hot runner, passing the rubber through a mold gate and into a mold cavity. The process is characterized by the rubber flowing at cross angles after the rubber is injected into the runner and before the rubber enters into the mold gate to uniformly increase the temperature of the rubber as it flows through the runner.

In one aspect of the disclosed method, the runner is a branched distribution runner leading to a plurality of molds.

BRIEF DESCRIPTION OF THE DRAWINGS

The invention will be described by way of example and with reference to the accompanying drawings in which:

FIG. 1 is a mold with an insert modified in accordance with the invention;

FIG. 2 is a modified runner plate;

FIG. 3 is a section view of the modified runner plate along line 3—3;

DETAILED DESCRIPTION OF THE PREFERRED EMBODIMENTS

Figure 4:
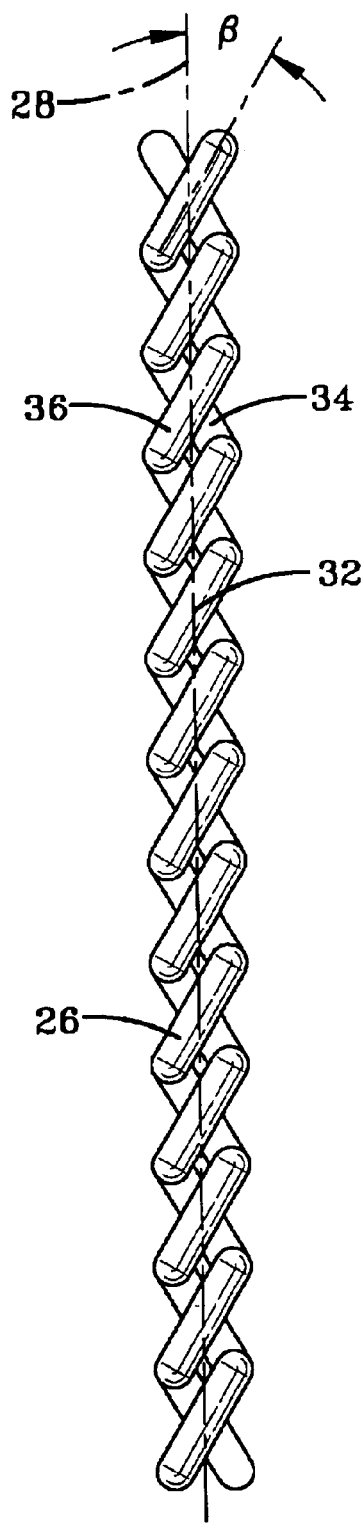
FIGS. 4–7 are embodiments of runners in accordance with the present invention.

FIG. 1 is an overview of a mold plate 10. The plate 10 has an injection runner 12 leading to at least one drop gate 14. The runner 12 illustrated is a branched runner comprising a main runner 16 and a set of branched distribution runners 18. At the end of each branched distribution runner 18 is a drop gate 14 leading to a mold 20. While a branched runner 12 is illustrated, the present invention may also be used in a system wherein the runner 12 leads directly to a single drop gate or injection port.

In accordance with the present invention, at least a portion 22 of the injection runner 12 is modified for mixing of the material flowing through the runner 12 and into the mold 20 by creating non-linear directional flow of the rubber as it flows through the runner 12. It may be the main runner 16 that is modified, as illustrated, or the branched distribution runners 18 may be modified. In whatever location selected, the modified portion 22 of the runner 12 will be located at a parting surface of the mold 10 for ease of cleaning and removal. The modified portion 22 of the runner 12 is schematically illustrated, as FIG. 2 illustrates the actual modified runner portion 22.

FIG. 2 illustrates a runner plate 24 forming either the top or the bottom of the modified portion 22 of the runner 12. Instead of a single bore defining the runner 12, the runner plate 24 has a plurality of inclined flow channels 26. The channels 26 are inclined at an angle β of 15° to 70° relative to the centerline 28 of the runner 12, preferably 30° to 60°. As the angle β of the channels 26 increases with respect to the centerline 28, the time required for any viscous compound to flow through the channels 26 also increases, and vice versa. The channels are illustrated with a semi-circular cross-section having a radius R, see FIG. 3; however, it is within this invention to form the flow channels with other cross-sections, such as elliptical, triangular, trapezoidal, square, or any other polygonal or curvilinear shape. The end points 27 of the channels 26 at the end of the modified runner portion 22 are located on the centerline 28 to be aligned with the remainder of the runner 12. While FIG. 2 illustrates only four complete cross channels 26, the number of cross channels 26 in either the top or bottom mold plate 24 is selected based upon the desired thermal mixing and temperature increase of the rubber as it flows through the modified runner portion 22.

Both the top and the bottom plate 24 forming the modified portion 22 of the runner 12 are formed in an identical configuration, such that when the top plate is positioned over the bottom plate, the flow channels 26 are inclined in opposing directions and form a series of junctions 32 along the length of the modified portion 22 of the runner 12.

FIGS. 4 to 7 illustrates a compound as it would appear as it flows through various embodiments of the modified runner 22, excluding the end portion of the rubber as it flows through the modified runner portion 22, it being understood that the crossed ends will terminate at the centerline 28 of the runner portion 22 as shown in FIG. 2. The compound 30 alternatively flows through the channels 26 formed in a top plate of the mold 10 or through the channels 26 formed in a bottom plate of the mold 10. The flowing compound meets and mixes at the various junctions 32 spaced along the length of the runner. At the end of each channel 26, the rubber flow changes direction when it enters the opposing channel. The energy input from the flow redirection also increases the rubber temperature.

In FIG. 4, the channels 26 form one of the simplest configuration in accordance with the invention. Junctions 32 are formed between the bottom plate channels 34 and the top plate channels 36 along the lengths of the channel. At each junction 32, the compound flowing from both the upper and lower channels meet and mix, transferring heat absorbed by the mold and increasing the temperature of the compound 30. For the illustrated embodiment, the thirteen junctions 32 occur along the runner centerline 28. The channels 26 are inclined at an angle of about 30° relative to the runner centerline 28.

The radius R of the channels 26 may be selected so that the cross sectional area created by the channels 26 is equivalent to the cross sectional area of a conventional single bore runner. Alternatively, the total cross sectional area of the channels may be greater than that of a conventional single bore runner. In such a construction, a larger volumetric flow rate of rubber through the gate is realized; however, the increase in rubber temperature as it flows through the modified runner will be reduced in comparison to a modified runner with an equivalent cross sectional area. The total cross sectional area may also be selected to be less than that of a conventional single bore runner. In such a construction, a greater temperature increase is realized, however, the volumetric flow rate through the runner is decreased in comparison to a conventional runner.

Figure 5:
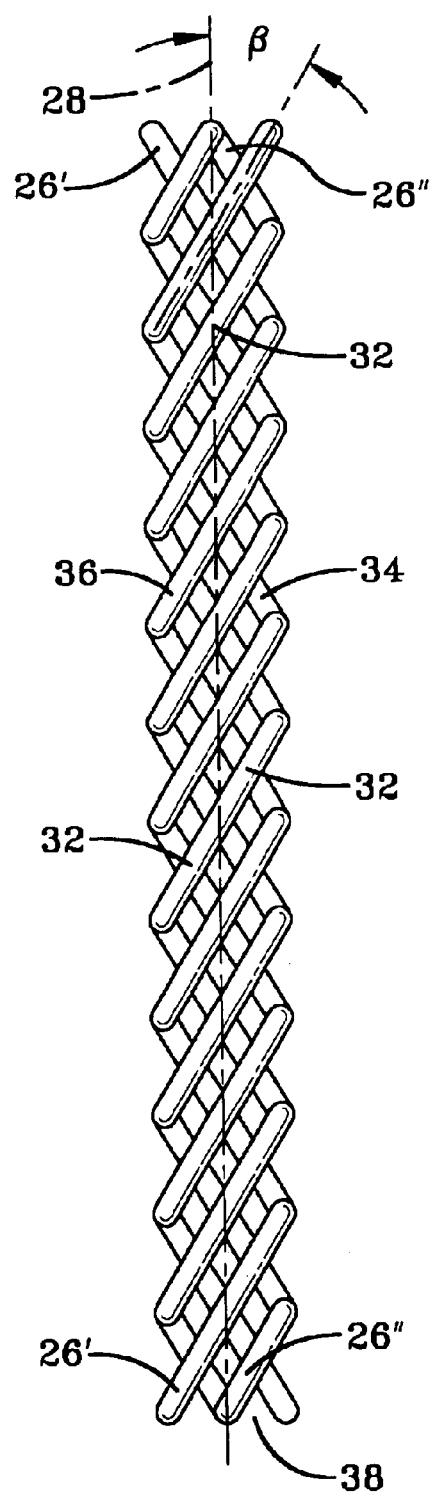

In FIG. 5, the same inclination angle β is used, however, instead of a single channel defining the end location 38 of each modified mold half, a pair of channels 26', 26" are located at the end location 38 of each modified mold half. The increase in the number of channels 26 at the end location 38 results in an increased width of the modified runner portion 22 and more junctions 32 along the runner length; there being a total of 40 junctions spaced along the length of the illustrated runner. As discussed above, the total cross sectional area of the channels 26 is optimized to achieve the desired increase in rubber temperature and volume of rubber flow through the runner.

Figure 6:
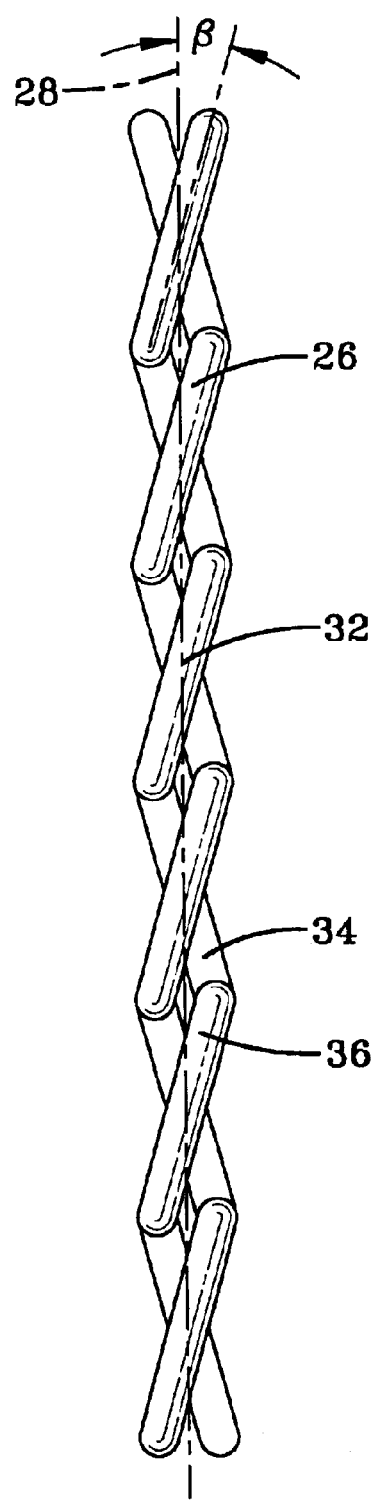
Figure 7:
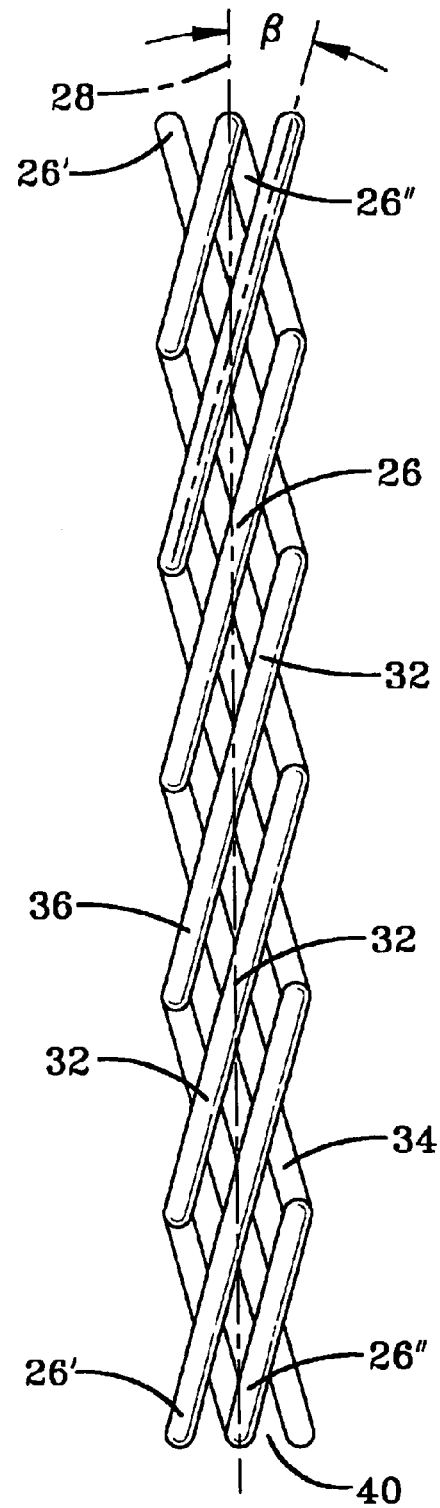

In FIG. 6, the channels 26 are inclined at an angle of about 15° relative to the runner centerline 28. By forming the channels 26 with a decreased inclination angle, the runner 22 has fewer junctions 32, and rubber flows through the runner in a shorter distance. FIG. 7 illustrates channels 26 formed at the same angle as the channels 26 of FIG. 6, but with two channels 26', 26" at each end location of each modified mold half, resulting in a greater number of junctions.

Alternatively, the top and bottom mold plates 24 may be fixed into the mold 10 such that the channels 26 do not intersect to form junctions 32, but instead only connect at the end portions to form cross-directional flow patterns resembling a zig-zag pattern through the modified portion of the runner.

The modified portion 22 of the runner 12 mixes the rubber flow boundary layer into the flow profile of the rubber at each junction 32 of the channels 26. Through use of the modified runner 12, heat absorbed by the rubber boundary layer at the mold surface is more efficiently transferred into the center of the rubber flow profile. As a result, the average temperature of the rubber entering the mold at the drop gates is increased and is more uniform. Thus, cure times are decreased for injection molded parts without a major increase in injection time and without rubber scorch at the drop gate entrance.

The diameter of a typical gate entrance can be increased at the drop gate entrance because part of the rubber heating currently accomplished by the drop gate will now be accomplished by the modified runner. The modified runner provides shorter cure and cycle times than currently possible by present rubber injection and drop gate designs.

Additionally, the present invention can be used to retro fit older injection systems with a minimal infusion of capital since the single bore runners can be machined out of the mold plate and replaced with modified runner plates in accordance with the present invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is therefore, to be understood that changes can be made in the particular embodiments described which will be within the full intended scope of the invention as defined by the following appended claims.

What is claimed is:

1. An assembly for injection molding rubber comprising a mold cavity, a gate located immediately adjacent to the mold cavity, and a hot runner in communication with the gate, the hot runner being formed from a top plate and a bottom plate, wherein:

a portion of the hot runner in both the top plate and the bottom plate is formed from a plurality of single direction inclined spaced flow channels, the channels in each plate being inclined at an angle relative to a centerline of the runner, and the channels in each plate being inclined in the same single direction such that when the top plate is positioned over the bottom plate to form the runner, the inclined spaced flow channels of the top and bottom plates are inclined in opposing directions to create cross directional flow of material through the portion of the runner.

2. An assembly in accordance with claim 1 wherein the inclined spaced flow channels in the top and bottom plates are inclined at angles of 15° to 70° relative to the centerline of the runner.

3. An assembly in accordance with claim 2 wherein the inclined spaced flow channels in the top and bottom plates are inclined at angles of 30° to 60° relative to the centerline of the runner.

4. An assembly in accordance with claim 1 wherein the inclined spaced flow channels have a cross-sectional configuration selected from the group consisting of semi-circular, elliptical, trapezoid, triangular, square, polygonal, and curvilinear.

5. An assembly in accordance with claim 1 wherein the hot runner is a branched runner comprising a main runner and a set of branched distribution runners and the portion of the hot runner having the inclined spaced flow channels is in the main runner.

6. An assembly in accordance with claim 1, the assembly further comprised first and last inclined spaced flow channels, wherein the end points of the first and last inclined spaced flow channel in each plate are located on the centerline of the runner.

7. An assembly in accordance with claim 1 wherein, the cross sectional area of the portion of the runner having the inclined spaced flow channels is equivalent to the cross sectional area of remainder of the runner.

8. An assembly in accordance with claim 1 wherein a pair of inclined spaced flow channels in each mold plate define an end location of the portion of the runner having the inclined spaced flow channels.

* * * * *